United States Patent [19]

Farrington et al.

[11] 4,268,587
[45] May 19, 1981

[54] SOLID STATE, AMBIENT TEMPERATURE ELECTROCHEMICAL CELL

[75] Inventors: Gregory C. Farrington, Elnora; Walter L. Roth, Schenectady, both of N.Y.

[73] Assignee: General Electric Company, Schenectady, N.Y.

[21] Appl. No.: 840,997

[22] Filed: Oct. 11, 1977

[51] Int. Cl.³ .............................................. H01M 6/18
[52] U.S. Cl. ..................................... 429/193; 429/194
[58] Field of Search ................ 429/191, 193, 218, 194

[56] References Cited

U.S. PATENT DOCUMENTS

| | | | |
|---|---|---|---|
| 2,631,180 | 3/1953 | Robinson | 429/193 |
| 3,907,591 | 9/1975 | Lauck | 429/218 |
| 3,912,536 | 10/1975 | Galli et al. | 429/193 |
| 3,933,523 | 1/1976 | Dubin et al. | 429/191 |
| 3,953,231 | 4/1976 | Farrington et al. | 429/193 |
| 3,970,473 | 7/1976 | Roth et al. | 429/191 |
| 4,049,468 | 9/1977 | Ito | 429/193 |

OTHER PUBLICATIONS

Liang et al., A High-Voltage, Solid-State Battery System, Journal of the Electrochemical Society, 116 (1969), pp. 1322-1323.

*Primary Examiner*—Donald L. Walton
*Attorney, Agent, or Firm*—Paul R. Webb, II; James C. Davis, Jr.

[57] ABSTRACT

A solid state, ambient temperature electrochemical cell is described which includes a lithium type or a sodium type anode, a cathode of pressed sulfur and carbon containing therein a nominal amount of a non-aqueous solvent with ionic conductivity enhancing material, a solid ion-conducting electrolyte between and in contact with the anode and the cathode, and a casing enclosing the anode, the cathode and the electrolyte. Such a cell is described also which includes a liquid mercury-indium alloy on at least a portion of the solid ion-conducting electrolyte in contact with the anode.

3 Claims, 4 Drawing Figures

SOLID STATE, AMBIENT TEMPERATURE ELECTROCHEMICAL CELL

This invention relates to solid state, ambient temperature electrolyte cells and, in particular, to such cells employing a lithium type or a sodium type anode, a cathode of pressed sulfur, carbon, and a non-aqueous solvent, and a solid ion conducting electrolyte.

Sodium sulfur cells which operate at elevated temperatures, are known in the prior arts as, for example, described in Kummer et al, U.S. Pat. No. 3,404,036. A solid state electrochemical cell is described, for example in U.S. Pat. No. 3,970,473—Roth et al. In this patent, there is described a lithium type anode, a cathode of a non-stoichiometric lithium compound, and a solid lithium-sodium aluminate electrolyte.

In U.S. Pat. No. 3,953,231—Farrington et al, there is described a sealed lithium-sodium sulfur cell for ambient temperature operation which includes a lithium type anode, a cathode of sulfur in a non-aqueous electrolyte with an ionic conductivity enhancing material, the cathode can contain carbon and a polymer binder and a solid lithium-sodium aluminate electrolyte.

In U.S. Pat. No. 3,933,523—Dubin et al, there is described a solid state ion-conducting electrolyte with a liquid metallic layer on one major surface thereof. In this patent a solid sodium ion-conductive electrolyte has a liquid mercury-indium alloy layer adhering intimately to one major surface of the electrolyte.

Solid state cells have potential advantages of long life, ease of manufacture, and high energy density. Miniaturization of both the physical dimensions and power requirements of electronic circuitry has given recent impetus to their development. Because of the low resistance of such $Ag^+$ conductors as $RbAg_4I_5$, considerable effort has been devoted to solid state cells using silver anodes. However, silver is a poor reducing agent. The standard potential of the $Ag/Ag^+$ coupled is $+0.79$/volt at $25°$ C. compared to $-3.0$/volt for $Li/Li^+$ and $-2.7$/volt for $Na/Na^+$ at the same temperature. At best, $Ag/RbAg_4I_5/X$ cells have open circuit potentials of less than 1.0 volt and specific energies of 4–6 watt hours/kg at $25°$ C.[1]

Lithium and sodium anodes are of greater interest for cells of high voltage and energy density. Most lithium or sodium anode cells that have been proposed previously utilize either a separate mixture of metal salts or the salt formed in situ upon initial anode/cathode contact as electrolytes. Current interest is focused on lithium systems because of the generally greater ionic conductivity of its salts. Few solid state lithium cells have exhibited useful performance. Most suffer from a high internal resistance due to poor electrolyte conductivity. This resistance increases during cell life as discharge products accumulate on the cathode interface. Rapid self discharge resulting from reactant inter-diffusion through thin and imperfect electrolyte barriers often occurs in cells employing electrolytes formed spontaneously in situ. A typical $Li/LiI/AgI$ cell is described by C. C. Liang and B. Bro in an article entitled "A High-Voltage, Solid-State Battery System" in the *Journal of the Electrochemical Society*, 116 (1969), pages 1322–23.

The present invention is directed to a solid state, ambient temperature electrochemical cell which functions at much higher current densities for longer times than other solid state cells described in the literature. As opposed to sodium-sulfur cells which operate at elevated temperatures, the cell of the present invention operates at ambient temperature and requires no additional separation between anode and cathode other than that provided by the solid-ion conducting electrolyte. As opposed to the above described ambient temperature sodium-sulfur cell, the sulfur is not immersed in a non-aqueous solvent.

The primary objective of our invention is to provide a solid state electrochemical cell which operates at ambient temperature, has high reliability, long shelf life and high energy density.

In accordance with one aspect of our invention, a solid state, ambient temperature electrochemical cell employs a lithium type or a sodium type anode, a cathode of pressed sulfur and carbon containing therein a nominal amount of a non-aqueous solvent with ionic conductivity enhancing material therein, a solid-ion conducting electrolyte between and in contact with the anode and the cathode, and a casing enclosing the anode, the cathode and the electrolyte.

These and various other objects, features, and advantages of the invention will be better understood from the following description taken in connection with the accompanying drawing in which.

Figure 1:
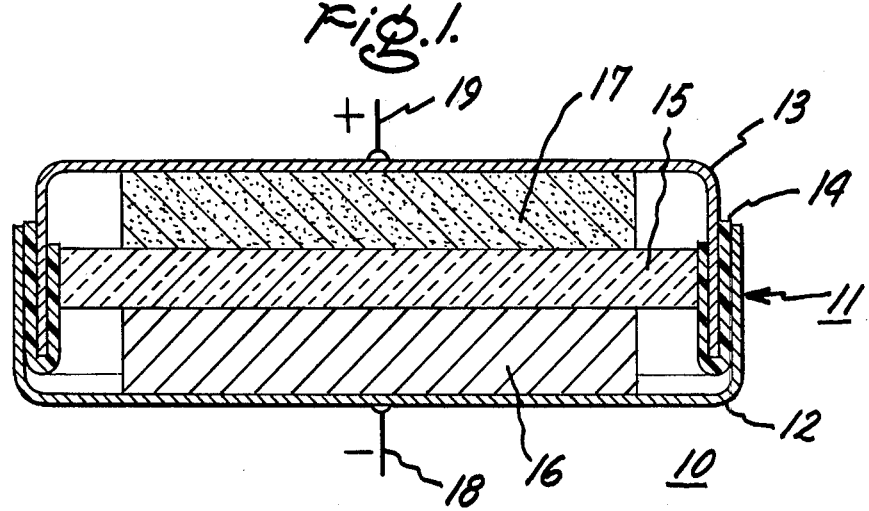
FIG. 1 is a sectional view of electrochemical cell made in accordance with our invention.

In FIG. 1 of the drawing, there is shown generally at 10 a solid state, ambient temperature electrochemical cell embodying our invention. Cell 10 has a casing 11 which includes an anode compartment 12 and a cathode compartment 13 which are sealed together by means of a plastic gasket 14. A solid ion-conducting electrolyte 15 made of sodium beta-alumina separates positively the anode compartment from the cathode compartment and is shown as having its edge butting against the interior surface of gasket 14. An anode 16 is shown in the form of a solid piece of sodium positioned against electrolyte 15 and the interior surface of the anode compartment 12. A cathode 17 is shown as comprising pressed powdered sulfur and carbon powder mixed with a small amount of Teflon polymer binder and containing one drop of propylene carbonate with 0.2 M tetrabutylammonium tetrafluoroborate and 0.2 M $NaClO_4$. Cathode 17 is positioned against the opposite major surface of electrolyte 15 and against the interior surface of cathode compartment 13. Electrical leads 18 and 19 are shown connected to the exterior surface of the anode and cathode compartments, respectively. The resulting structure is a solid state, ambient temperature electrochemical cell made in accordance with our invention.

Figure 2:
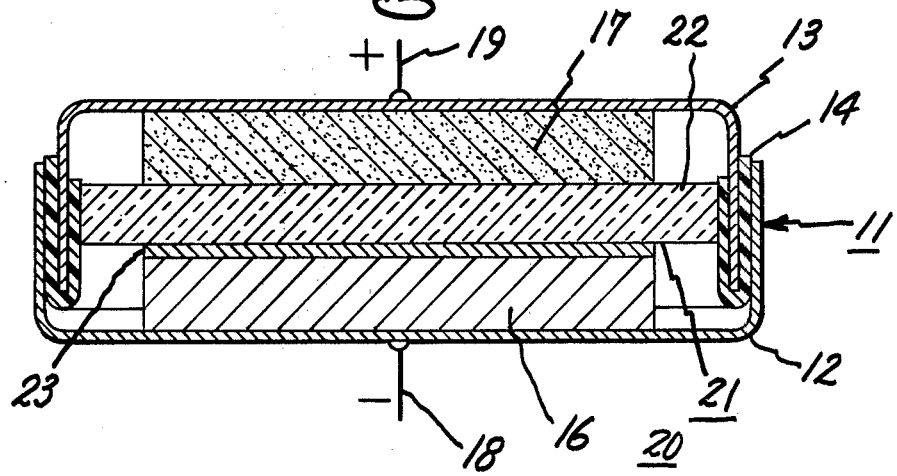
FIG. 2 is a section view of a modified electrochemical cell made in accordance with our invention.

In FIG. 2 of the drawing, there is shown at 20 a modified electrochemical cell made in accordance with our invention. Similar to the configuration shown in FIG. 1, cell 20 has a casing 11 with an anode compartment 12 and a cathode compartment 13 sealed by a plastic gasket 14. A solid ion-conductive electrolyte comprises a sodium beta-alumina disc 22 with a layer 23 of liquid mercury-indium alloy adhering intimately to at least a portion of the major surface of the electrolyte facing the anode compartment. An anode 16 of the solid sodium is provided within anode compartment 12 and is positioned against layer 23 and the interior surface of compartment 12. A cathode 17 is positioned in cathode compartment 13 in contact with the opposite major surface of electrolyte 22 and against the interior surface of cathode compartment 13. Electrical leads 18 and 19 are connected to compartments 12 and 13, respectively. This modified cell is a solid state ambient temperature electrochemical cell made in accordance with our invention.

We found that we could form a solid state ambient temperature electrochemical cell which includes a casing. The casing can be made of a variety of metallic or non-metallic materials which are not affected by the reactants employed in the cell. The cell can be sealed in any conventional manner. For example, the cells shown in FIGS. 1 and 2 of the drawing having casing portions of nickel plated steel while the plastic gasket for sealing is made of nylon. It will, of course, be appreciated that the anode and cathode must be electrically insulated from one another. Other cell configurations are also suitable.

An anode is positioned within the casing which anode must be in contact with a solid ion-conducting electrolyte. The anode can be in contact with the casing providing the anode compartment is electrically insulated from the cathode compartment. We found further that the anode is selected from the class consisting of lithium, lithium as an amalgam, alloys of lithium with aluminum or silicon, sodium, sodium as an amalgam or alloys of sodium with aluminum or silicon. The cathode is positioned in a similar manner on the opposite surface of and in contact with the solid ion-conducting electrolyte. Similarly, the cathode can be in contact with the cathode compartment when appropriately electrically insulated from the anode compartment. We found that the cathode can be formed of pressed sulfur powder and carbon powder. If desired, a small amount of Teflon polymer binder can be added to improve the integrity of the cathode. The cathode contains a nominal amount, such as one drop, of a non-aqueous solvent with ion-conductivity enhancing materials. Such non-aqueous electrolyte disperses throughout the cathode adsorbing on the carbon surfaces. The non-aqueous electrolyte can be added in the form of a liquid or of a gel. Various non-aqueous solvents are suitable such as propylene carbonate, tetrahydrofuran, and dioxolane. Various ionconductivity enhancing materials are also suitable such as for example, 0.2 M tetrabutylammonium tetrafluoroborate and 0.02 M $NaClO_4$. We found that the solid ion-conducting electrolyte is selected from the class consisting of sodium beta-alumina, sodium beta-alumina, or lithium-sodium aluminate having an approximate composition of $LiNaO \cdot 9Al_2O_3$ of which 1.3 to 85.0 percent of the total alkali ion content is lithium. Neither the cathode nor the anode is immersed in a liquid solvent.

We found further that we can improve the performance of the cell of our invention by a factor of 100 by including a liquid mercury-indium layer adhering intimately to at least a portion of the major surface of the electrolyte against which is in contact with the anode. Above referenced U.S. Pat. No. 3,933,523 describes a solid sodium ion-conductive electrolyte with liquid metallic layer. While the liquid mercury indium-alloy layer can adhere intimately to the entire major surface of the electrolyte, it can also cover that portion of the major surface of the electrolyte with which the anode has contact.

We assembled a solid state, ambient temperature electrochemical cell embodying our invention. The cell had a casing of nickel plated steel material which included an anode compartment and a cathode compartment which were sealed together by a nylon gasket. A solid ion-conducting electrolyte made of sodium beta-alumina separated positively the anode compartment from the cathode compartment and had its edge butting against the interior surface of the gasket. A layer of liquid mercury-indium alloy adhered intimately to the portion of the major surface of the electrolyte facing the anode compartment and which was contacted by the anode. The anode was a solid piece of sodium material positioned against the liquid mercury-indium alloy and against the interior surface of the anode compartment. The cathode comprised pressed powdered sulfur and carbon powder mixed with a small amount of Teflon polymer binder in a ratio of 60%:30%:10% and containing one drop of propylene carbonate with 0.2 M tetrabutylammonium tetrafluoroborate and 0.2 M $NaClO_4$. A nickel screen was pressed into the cathode as a current collector. The cathode was positioned against the opposite major surface of the electrolyte. The current collector was connected to the interior surface of the cathode compartment. Electrical leads were connected to the exterior surface of the anode and cathode compartments, respectively. This cell had an initial open circuit potential of 2.8 volts. Upon discharge at a controlled potential of 2.1 V, cell current was 83 $\mu A/cm^2$ initially, gradually declining to 23 $\mu A/cm^2$ after 72 hours continuous operation. Little increase in cell resistance was observed during this period, behavior far exceeding that expected from literature reports.

An example of a solid state, ambient temperature electrochemical cell made in accordance with our invention is set forth below:

EXAMPLE I

A solid state, ambient temperature electrochemical cell was made in accordance with the above description and generally as shown in FIG. 2 of the drawing. A 4 millimeter thick, 1.3 centimeter diameter disc of solid sodium beta-alumina was polished and heated at 160° C. in vacuo. A mercuryindium alloy was applied to the center portion of one major surface of the electrolyte by rubbing as described in the above-mentioned U.S. Pat. No. 3,933,523. In a nitrogen filled drybox, freshly cut sodium was pressed against the mercuryindium layer on the one major surface of the electrolyte. The sodium adhered tightly. The cathode was prepared by mixing and pressing together powdered sulfur powder, fine carbon powder and a small amount of polytetrafluoroethylene binder in a ratio of 30%:60%:10%. A drop of propylene carbonate containing 0.2 M tetrabutylammonium tetrafluoroborate and 0.02 M $NaClO_4$ was added to and was dispersed within the cathode. The cathode was pressed lightly against the center portion of the opposite major portion of the electrolyte.

The electrolyte, anode and cathode were assembled within a two piece metallic casing of nickel plated steel. The anode and cathode were electrically connected to their respective casing compartment. A plastic seal of nylon held the compartments together, sealed the casing, and insulated electrically one compartment from the other compartment. An electrical lead was attached to each cell compartment.

EXAMPLE II

Figure 3:
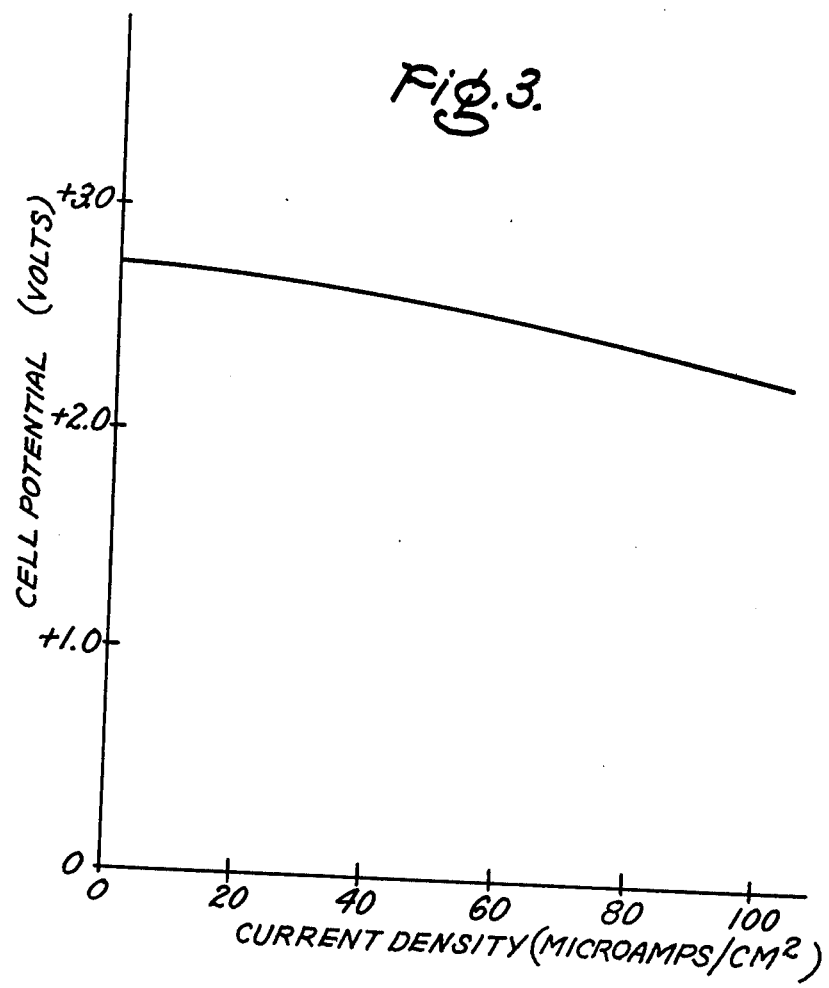
FIG. 3 is polarization curve of a cell made in accordance with FIG. 2, in which cell potential in volts is plotted against current density in microamperes per square centimeter.

The cell of Example I had an initial open circuit potential of 2.8 volts. After 72 hours, at a controlled potential of 2.1 volts, the open circuit potential was 2.4 volts which was more consistent with that expected with a sodium sulfur reaction. This discharge is shown in FIG. 3 wherein cell potential in volts was plotted against current density in microamperes per square centimeter.

EXAMPLE III

Figure 4:
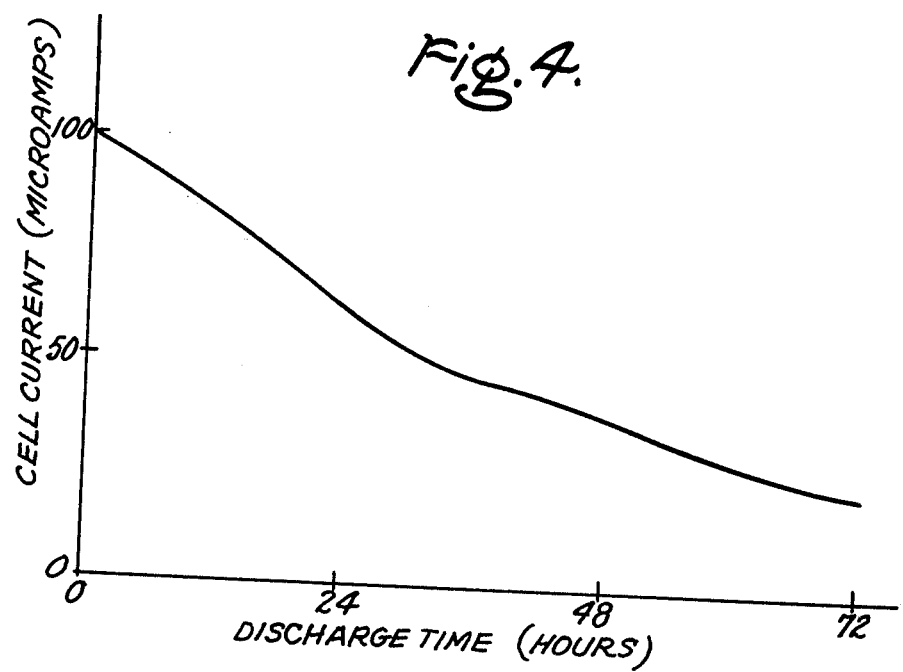
FIG. 4 is a performance curve over a 72 hour discharge of a cell made in accordance with FIG. 2.

The performance of the cell of FIG. 1 is shown in FIG. 4 wherein cell current in microamperes was plotted against discharge time in hours. Overall cell discharge characteristics are remarkably good. Output current varied from 83 $\mu A/cm^2$ to 23 $\mu A/cm^2$ at a controlled potential of 2.1 V over 72 hours at 22° C. Discharge was interrupted deliberately, not because of cell failure. The cell resistance at the end of discharge, 1800 ohms, was only slightly greater than at the start, 1400 ohms. Over the discharge period, 13.8 coulombs passed and $26\mu/cm^2$ of Na were oxidized from the anode interface. Sodium beta-alumina contact was not lost nor did a resistive film of discharge product accumulate on the cathode interface. Both results are surprising in light of previous reports.

EXAMPLE IV

Separate experiments which we performed to examine interface behavior reveal that the excellent sodium beta-alumina sulfur cell performance is in part the result of the mercury-indium layer on the anode electrolyte interface. A typical sodium-mercury-indium layer beta-alumina interface has a resistance of 100 ohm-cm$^2$ at 22° C. At the same temperature a Na/beta alumina interface has a resistance of 770 ohm-cm$^2$. In the presence of the wetting film, the region where Na, mercuryindium, and beta-alumina meet rapidly conducts sodium from the depleting anode to the beta alumina surface while retaining intimate contact with both. Use of the mercury-indium layer appears a significant advance in solid state cells.

While other modifications of the invention and variations thereof which may be employed within the scope of the invention have not been described, the invention is intended to include such as may be embraced within the following claims:

What we claim as new and desire to secure by Letters Patent of the United States is:

1. A sealed solid state, ambient temperature electrochemical cell comprises a casing including an anode compartment and a cathode compartment, the compartments insulated electrically from each other, an anode positioned within and in electrical contact with the anode compartment, the anode selected from the class consisting of lithium, lithium as an amalgam, alloys of lithium with aluminum or silicon, sodium, sodium as an amalgam or alloys of sodium with aluminum or silicon, a cathode positioned within and in electrical contact with the cathode compartment, the cathode comprising pressed sulfur powder and carbon powder containing therein a nominal amount of a non-aqueous solvent with ionic conductivity enhancing materials, and a solid ion-conducting electrolyte positioned between the anode and the cathode and in contact with both the anode and the cathode, the solid electrolyte selected from the class consisting of sodium beta-alumina, sodium beta"-alumina, or lithium-sodium aluminate having an approximate composition of LiNaO.9Al$_2$O$_3$ of which 1.3 to 85.0 percent of the total alkali ion content is lithium.

2. A solid state, ambient temperature electrochemical cell as in claim 1, in which a liquid mercury-indium alloy layer adheres intimately to one major surface of the electrolyte adjacent to and in contact with the anode.

3. A sealed solid state, ambient temperature electrochemical cell comprises a casing including an anode compartment and a cathode compartment, the compartment insulated electrically from each other, a solid sodium anode positioned within and in electrical contact with the anode compartment, a cathode positioned within and in electrical contact with the cathode compartment, the cathode comprising pressed sulfur powder and carbon powder containing a polytetrafluoroethylene binder in a ratio of 60%:30%:10% and containing one drop of propylene carbonate with 0.2 M tetrabutylammonium tetrafluoroborate and 0.2 M NaClO$_4$, a nickel screen current collector pressed into the cathode, a solid sodium beta-alumina electrolyte, a liquid mercury-indium alloy layer adhering intimately to a portion of one major surface of the electrolyte, the electrolyte positioned between the anode and the cathode, the anode in contact with the mercury-indium alloy layer, and the cathode in contact with the opposite major surface of the electrolyte.

* * * * *